United States Patent [19]
Zmek

[11] Patent Number: 5,233,174
[45] Date of Patent: Aug. 3, 1993

[54] WAVEFRONT SENSOR HAVING A LENSLET ARRAY AS A NULL CORRECTOR

[75] Inventor: William Zmek, Naugatuck, Conn.

[73] Assignee: Hughes Danbury Optical Systems, Inc., Danbury, Conn.

[21] Appl. No.: 849,569

[22] Filed: Mar. 11, 1992

[51] Int. Cl.$^5$ .............................................. G01J 1/20
[52] U.S. Cl. ................................. 250/201.9; 356/121
[58] Field of Search ....................... 250/201.9, 208.5; 356/121, 124, 125

[56] References Cited

U.S. PATENT DOCUMENTS

| | | | |
|---|---|---|---|
| H615 | 4/1989 | Feinleib et al. | 250/201.9 |
| 3,547,546 | 12/1970 | Schier | 350/162 |
| 4,141,652 | 2/1979 | Feinleib | 250/201.9 |
| 4,518,854 | 5/1985 | Hutchin | 250/201.9 |
| 4,530,736 | 7/1985 | Mutter | 156/643 |

Primary Examiner—David C. Nelms
Assistant Examiner—Que T. Le
Attorney, Agent, or Firm—W. K. Denson-Low; W. J. Streeter; R. A. Hays

[57] ABSTRACT

A wavefront sensor (10) includes a radiation sensor (2) and an array (12) of lenslets (12A) that are optically coupled to the radiation sensor. The array of lenslets has a radiation receiving surface for receiving an incident wavefront and for focussing the wavefront at a plurality of focal positions upon the radiation sensor. Each of the lenslets comprises a diffractive optical element having an optical center that is located at a predetermined point for inducing an equal and opposite tilt to a portion of the wavefront incident on the lenslet. As a result, an aberration within that portion of the wavefront is cancelled. The predetermined point is determined to be equal to and opposite a focal spot shift of the lenslet.

15 Claims, 3 Drawing Sheets

WAVEFRONT SENSOR HAVING A LENSLET ARRAY AS A NULL CORRECTOR

FIELD OF THE INVENTION

This invention relates generally to optical devices and, in particular, relates to wavefront sensing methods and apparatus.

BACKGROUND OF THE INVENTION

The following two patents are cited for showing diffractive lens elements, or lenslets. In U.S. Pat. No. 3,547,546, issued Dec. 15, 1970, entitled "Multiple Image Forming Device", H. Schier describes a zone plate matrix 10 having a plurality of zone plates 12, each being a diffractory optical image forming device. Each zone plate 12 is formed from a series of concentric annular zones 14 and 16 of alternating transparent and non-transparent regions which decrease in width from a center outward, or from all transparent zones (FIG. 4), in which alternate zones shift the phase of radiation by 180° with respect to adjacent zones. In U.S. Pat. No. 4,530,736, issued Jul. 23, 1985, entitled "Method for Manufacturing Fresnel Phase Reversal Plate Lenses", W. E. Mutter discloses a photolithographic process for fabricating phase reversal plate and sinusoidal phase reversal plate Fresnel phase plate lenses. p As seen in FIG. 1a, a conventional wavefront sensor is designed to achieve a null result with a flat input wavefront. In FIG. 1a, a flat wavefront (FWF) impinges on an optical element comprised of a two dimensional array 1 of diffractive lenslets 1A. Each of the lenslets 1A of the array 1, shown in the plan view of FIG. 1c, focuses the incident FWF onto a surface of a sensor 2. The sensor 2 may be a Charge Coupled Device (CCD) having a two dimensional array of radiation sensors for sensing the focussed radiation.

The system of FIG. 1a is suitable for applications in which a null result is desired, that is, a flat input wavefront is provided. However, for those applications in which a measurement of wavefront aberration (i.e., aberration within the dynamic range of the sensor) is desired, a sensor that nulls with a FWF is not as accurate as a sensor that nulls when a desired aberrated wavefront (AWF) is input.

As seen in FIG. 1b, if the FWF is replaced by an AWF, the focal positions of the lenslets 1A of the array 1 are shifted by an amount that is related to a magnitude of the aberration at each lenslet 1A.

Referring to FIG. 2, one application for measuring very large aberration is encountered when testing fast aspheric mirrors at the center of curvature. A special set of optics, referred to as a null corrector 3, is positioned in the optical path. The null corrector 3 is designed, in accordance with an expected wavefront aberration, so as to convert the AWF to a FWF. Assuming that the null corrector 3 is properly designed, when an AWF having the expected aberration is incident on the null corrector 3, the lenslets 1A of the array 1 each focus the radiation onto predetermined ones of the sensors 2, giving the result of FIG. 1a. However, if the actual aberration of the incident wavefront differs from the expected aberration, the null corrector 3 will not operate as intended, and the result will more closely resemble FIG. 1b.

As can be appreciated, one disadvantage of the system shown in FIG. 2 is the requirement to design, align, and maintain the separate null corrector 3.

It is thus an object of this invention to provide a wavefront sensor having a lenslet array that also functions as a null corrector.

It is another object of the invention to provide a wavefront sensor having a lenslet array that also functions as a null corrector, with each lenslet being designed so as to counter an expected local wavefront tilt with an equal and opposite tilt.

SUMMARY OF THE INVENTION

The foregoing and other problems are overcome and the objects of the invention are realized by a wavefront sensor having a binary optics lenslet array optically coupled to CCD image sensor, or camera, and a controller that interprets the output of the CCD camera to determine an aberration of an incident wavefront. In accordance with the invention the lenslet array is designed to compensate for a specific aberration that may be expected in a particular application, resulting in a null sensor output when that aberration is input to the lenslet array.

More particularly, a wavefront sensor includes a radiation sensor and an array of lenslets that are optically coupled to the radiation sensor. The array of lenslets has a radiation receiving surface for receiving an incident wavefront and for focussing the wavefront at a plurality of focal positions upon the radiation sensor. Each of the lenslets is comprised of a diffractive optical element having an optical center that is located at a predetermined point for inducing an equal and opposite tilt to a portion of the wavefront incident on the lenslet. As a result, an aberration within that portion of the wavefront is cancelled. The predetermined point is determined to be equal to and opposite a focal spot shift of the lenslet.

Further in accordance with the invention there is disclosed a method for fabricating a lenslet array for use with a wavefront having a known aberration. The method includes a step of, for each lenslet of the lenslet array, determining a location of an optical center of the lenslet relative to a geometric center of an array cell within which the lenslet is contained. The step of determining includes the steps of (a) determining a focal spot shift of the aberrated wavefront at a position of the lenslet cell; and (b) shifting the optical center of the lenslet by an equal and opposite amount to the determined focal spot shift. A further step of the method fabricates the lenslet into or upon a surface of a substrate such that the optical center of the lenslet is positioned away from the geometric center of the cell by an amount equal to and opposite the determined focal spot shift.

For the case of spherical aberrations of the form:

$$w(\rho) = a\rho^4,$$

the step of determining a location of the optical center includes a step of determining a focal spot shift of the lenslet in accordance with the expression:

$$\text{spot shift} = 4a\rho_i^3 F,$$

wherein F is the focal length of the lenslet, (a) is a magnitude of the aberration, and where $(\rho_i^3)$ is a radial distance of an $i^{th}$ lenslet from a center of the wavefront.

BRIEF DESCRIPTION OF THE DRAWING

The above set forth and other features of the invention are made more apparent in the ensuing Detailed Description of the Invention when read in conjunction with the attached Drawing, wherein:

FIG. 1b illustrates an effect of inputting an aberrated wavefront to the lenslet array of FIG. 1a;

FIG. 3b is a plan view showing one of the lenslets of the lenslet array of FIG. 3a;

DETAILED DESCRIPTION OF THE INVENTION

Figure 1A:
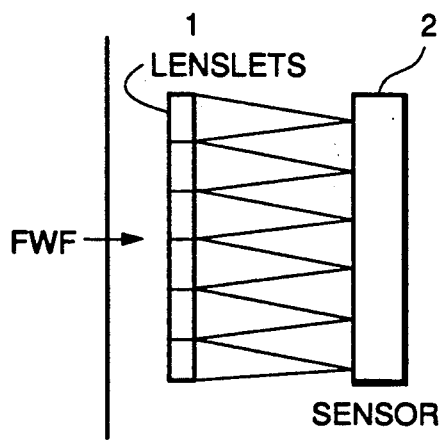
FIG. 1a illustrates a wavefront sensor having a lenslet array for focussing a flat wavefront onto a radiation sensor.
Figure 1B:
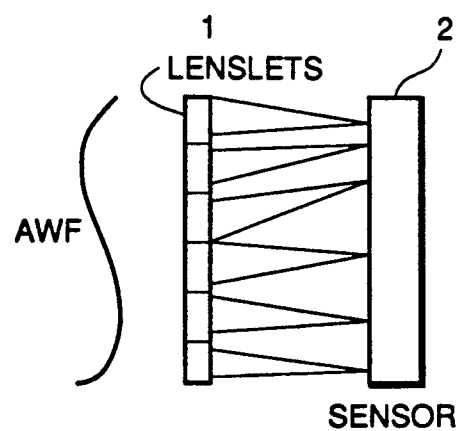
Figure 2:
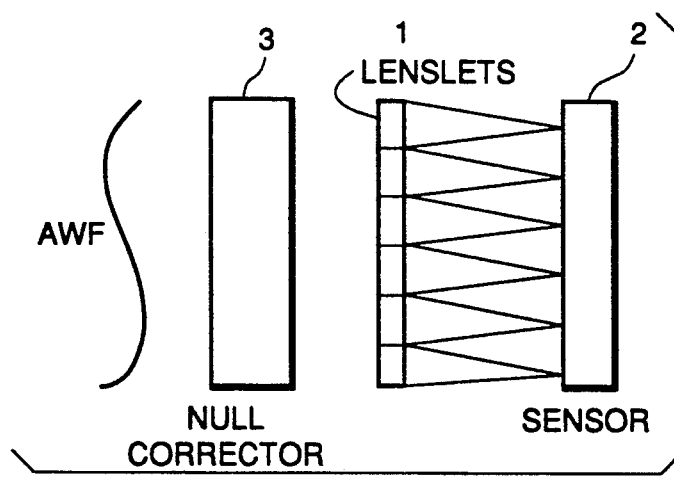
FIG. 2 illustrates a wavefront sensor having a null corrector positioned in front of the lenslet array for converting an aberrated wavefront into a flat wavefront.
Figure 3A:
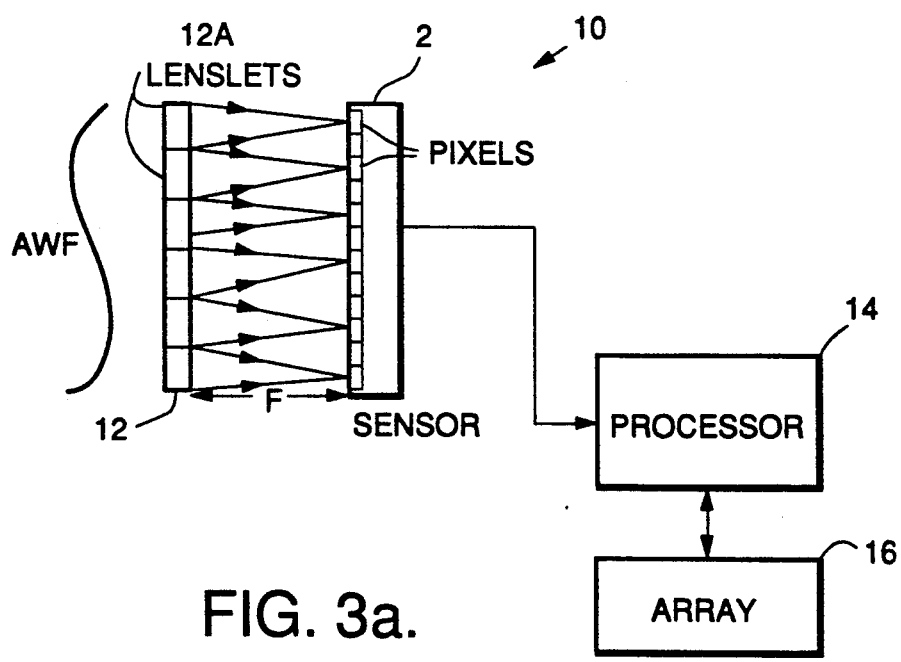
FIG. 3a illustrates a wavefront sensor constructed and operated in accordance with the invention, wherein the lenslet array also provides a null corrector function.
Figure 3C:
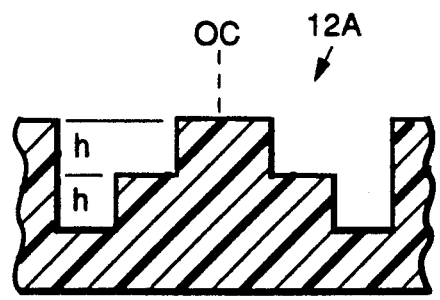
FIGS. 3c and 3d are cross-sectional views of two embodiments of binary optics lenslets.
Figure 3D:
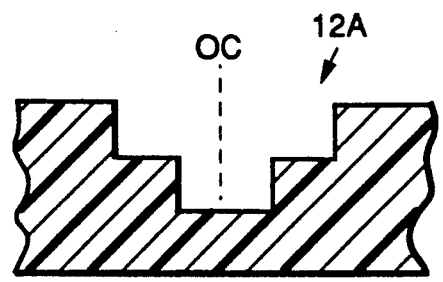
Figure 3B:
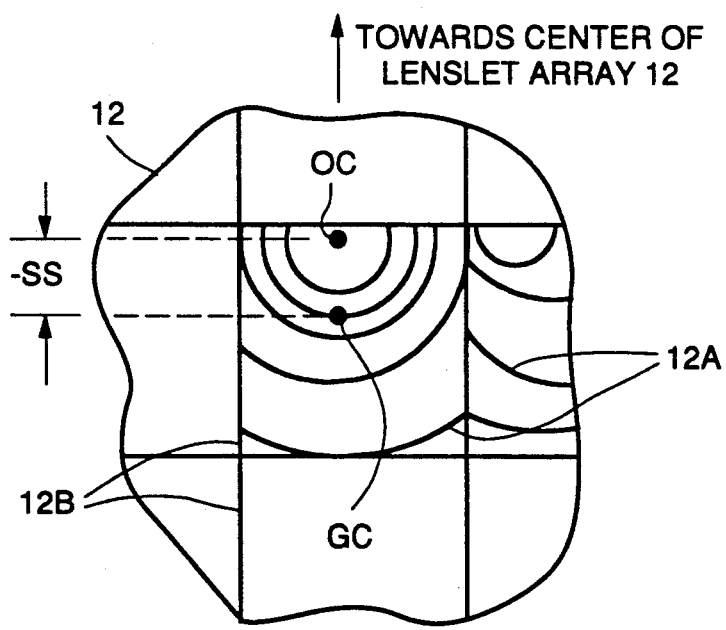

Reference is now made to FIG. 3a and FIG. 3b. FIG. 3a illustrates a wavefront sensor 10 constructed and operated in accordance with the invention, wherein a lenslet array 12 provides both a focussing function and a null corrector function for an aberrated wavefront. FIG. 3b is a plan view showing two of the lenslets 12A of the lenslet array 12 of FIG. 3a.

Each lenslet 12A has an associated focal length (F) for focussing radiation onto a focal plane that is preferably coincident with a radiation responsive surface of, by example, the CCD sensor 2. An output of the sensor 2 is coupled to a processor 14 which is enabled to determine a magnitude of the radiation sensed by each of a plurality of discrete radiation sensor elements, or pixels, that make up the sensor array 2. In a typical embodiment, the sensor array 2 is configured as a two-dimensional array comprised of several hundred or more discrete sensor elements.

There is now described a presently preferred method for determining the geometry of each of the lenslets 12A of the lenslet array 12. By example, the lenslet array 12 includes a 10 by 10 two dimensional array of lenslets 12A, the array having dimensions of approximately 10 millimeters by 10 millimeters. Each of the diffractive binary optics lenslets 12A is fabricated, as shown in FIGS. 3c and 3d, as an optical equivalent of a Fresnel zone plate, each binary optic having at least two steps of equal height.

Figure 4:
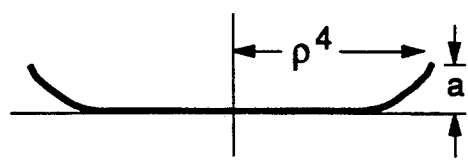
FIG. 4 is a graph showing an aberrated wavefront, in this case spherical aberration, the graph being useful in understanding a method of determining a lenslet position that provides a null correction function.

FIG. 4 is a graph that shows an exemplary spherical aberration of a wavefront. The vertical axis is taken to be the center of the wavefront, (a) is a magnitude of the aberration, and $(\rho^4)$ is a radial distance from the center of the wavefront.

The Seidel spherical aberration for the wavefront is given by the expression:

$$\omega(\rho) = a\rho^4. \quad (1)$$

The average slope over the $i^{th}$ lenslet 12A at radial position $\rho_i$ is given by:

$$\partial\omega(\rho_i)/\partial\rho = 4a\rho_i^3, \quad (2)$$

where $\partial$ indicates a derivative. This expression treats each lenslet 12A as a point. A more accurate result is obtained by integrating over the linear dimension of a lenslet 12A, as described below.

A focal spot shift, that is the displacement of the focal point at the focal plane due to aberration, is given by the expression:

$$\text{spot shift} = (\partial\omega(\rho_i)/\partial\rho)F_{lenslet}, \quad (3)$$
or
$$\text{spot shift} = 4a\rho_i^3 F, \quad (4)$$

where F is the focal length of the lenslet 12A. A typical focal length for one of the lenslets 12A is approximately 10 millimeters.

Figure 1C:
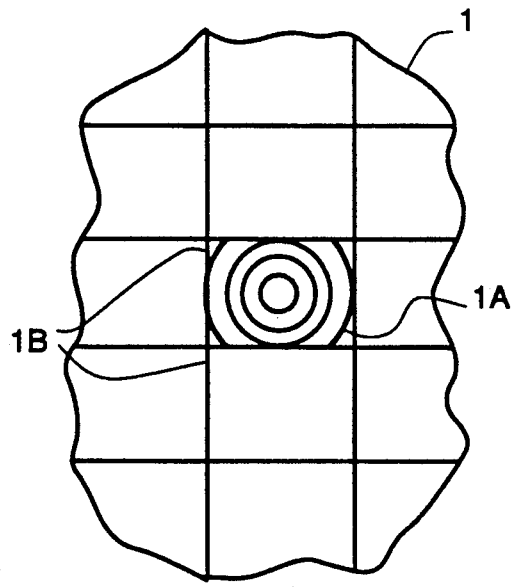
FIG. 1c is a plan view showing one of the lenslets of the lenslet array of FIGS. 1a and 1b.

In accordance with an aspect of the invention the focal spot shift, as determined by equation 4, is employed to shift by $(-4a\,\rho_i^3 F)$ an optical center (OC) of the lenslet 12A away from a geometric center (GC) of an array cell 12B within which the lenslet 12A is located. As seen in FIG. 3b, the OC of each lenslet 12A is shifted, within the associated array cell 12B, by an equal and opposite amount to the focal spot shift (SS) towards a center of the lenslet array 12. This is in contrast to the lenslet 1A of FIG. 1c wherein the optical center of the lenslet is coincident with the geometric center of the lenslet cell.

That is, the focal spot shift for each of the lenslets 12a is determined based upon an expected wavefront aberration at the position of the lenslet 12A. As a result, and as is seen in FIG. 3a, when a wavefront having the expected aberration is applied to the lenslet array 12, each of the lenslets 12A shifts a corresponding portion of the aberrated wavefront by an amount equal and opposite to the local tilt, or aberration of the wavefront, and provides a null corrected, point focussed image upon the radiation responsive surface of the sensor 2. The point focussed image does not exhibit the focal spot shift that would occur if the lenslet array 12 did not not null correct the aberrated wavefront, which is the desired result.

The processor 14 reads out the individual radiation sensor elements of the sensor 2 and compares the magnitude of the radiation sensed by each to a stored array 16 of expected, calibrated magnitudes. If a match is obtained the aberration of the incident wavefront can be considered to be equal to the expected aberration. If a match is not obtained, the aberration of the incident wavefront can be considered to differ from the expected aberration.

Furthermore, if the aberration of the input wavefront does not match the expected aberration, it is within the scope of the invention for the processor 14 to determine or measure the actual spot shift and, based on the known spot shift induced by each of the lenslets 12A, and in accordance with equations 1-4, to determine the actual aberration characteristics of the incident wavefront.

As seen in the cross-sectional views of FIGS. 3c and 3d, each of the lenslets 12A may be fabricated by a photolithographic process upon or into a surface of a transparent substrate comprised of, by example, fused silica or optical glass. Each of the lenslets 12A optically approximates a Fresnel zone plate. Each of the binary steps have an equal height (h) and are in phase so as to produce a predictable and high quality spot of focussed radiation upon the CCD sensor 2. For the illustrated two step Fresnel zone plate approximation, the aforementioned 10 millimeter focal length is achieved. As the number of binary steps are increased per lenslet 12A, higher spot quality is obtained. A minimum acceptable resolution of the CCD sensor 2 provides four square pixels (a 2×2 sub-array) per lenslet 12A. By example, for a 10×10 lenslet array the CCD sensor provides a minimum of 40×40 radiation responsive pixels to detect focal spot motion or displacement. For greater CCD pixel densities, such as 8×8 pixels per lenslet 12a, a finer resolution of focal spot motion or displacement is achieved. Preferably, the physical dimensions of the lenslet array 12 are approximately the same or slightly larger than the physical dimensions of the CCD sensor 2.

The teaching of the invention may be employed to construct, by example a nulling Hartmann-Shack wavefront sensor.

Figure 5A:
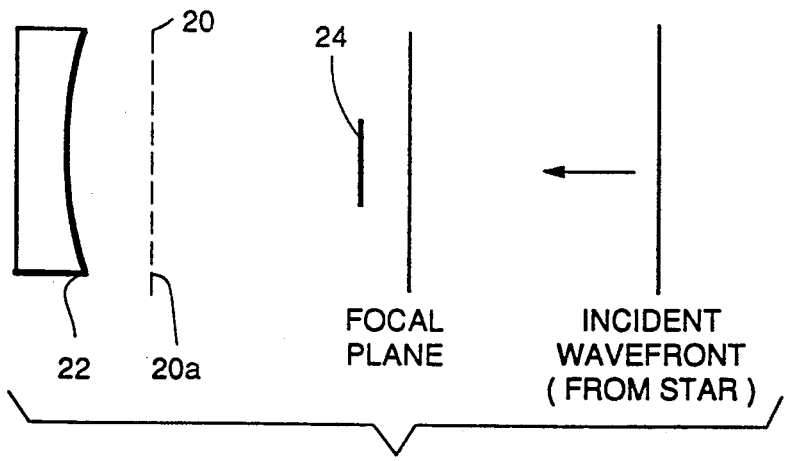
FIG. 5a illustrates a conventional Hartmann Wavefront Sensor.

Referring to FIG. 5a there is illustrated a conventional Hartmann Wavefront Sensor. A mask 20 having a plurality of uniformly distributed holes 20a is placed over the pupil of an optical system. By example, a telescope mirror 22 may be tested by recording with a photographic film 24 an array of spots found in front of or behind the mirror's focal plane. Deviations of the spot positions are determined from expected spot positions.

Figure 5B:
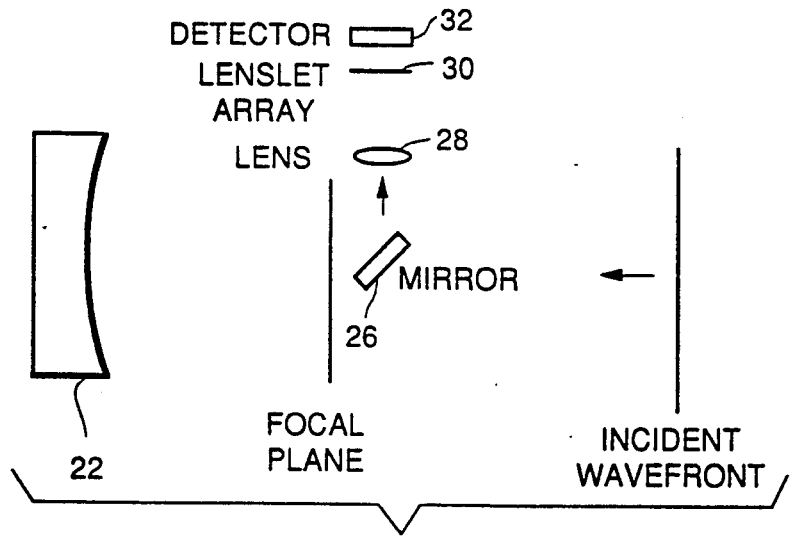
FIG. 5b illustrates a Hartmann-Shack Wavefront Sensor.

Referring to FIG. 5b, the Hartmann-Shack Wavefront Sensor employs a mirror 26 and lens 28 to relay the pupil to an accessible location, and to sample the wavefront with a lenslet array 30 and detector 32. As a result, the full scale mask 20 of FIG. 5a is not required.

In accordance with the invention, the lenslet array 30 is constructed in accordance with the teaching of the invention to also provide an aberration correction function.

Figure 6:
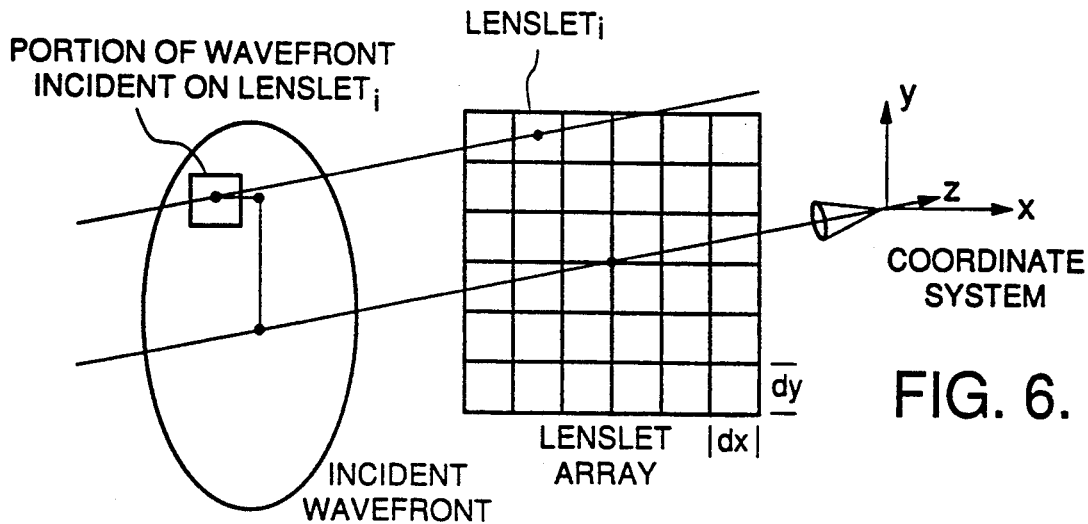
FIG. 6 shows a relationship of an ideal wavefront to a lenslet array, and is useful in understanding the determination of an average slope of the wavefront over a lenslet.

As was previously mentioned, a more accurate method of determining the slope of the incident wavefront over the lenslet is by integration, as opposed to considering the average slope at the center of the lenslet. In FIG. 6 the incident wavefront is considered an ideal wavefront to facilitate calculation of the displacements of the lenslet optical centers.

The average slope of the incident wavefront is found as follows:

$S_{AVEi,j}$ = AVE. SLOPE OVER LENSLET =

$$\frac{\int_{(i-.5)dx}^{(i+.5)dx} \int_{(j-.5)dy}^{(j+.5)dy} \left[\hat{i}\frac{\partial\omega(x,y)}{\partial x} + \hat{j}\frac{\partial\omega(x,y)}{\partial y}\right] \cdot da}{\int_{(i-.5)dx}^{(i+.5)dx} \int_{(j-.5)dy}^{(j+.5)dy} [\hat{i} + \hat{j}] \cdot da},$$

where the integrand is the dot product of the gradient vector of the desired aberrated wavefront, with the unit normal vector to the incremental area of integration.

It should be realized that modifications to the embodiment of the invention described above may be made without departing from the scope and spirit of the invention. For example, the sensor 2 could be a Vidicon tube or any other suitable radiation sensing device. Also, the lenslet array 12 may be fabricated from a number of different suitable substrate materials. As such, while the invention has been particularly shown and described with respect to a presently preferred embodiment thereof, it will be understood by those skilled in the art that changes in form and details may be made therein without departing from the scope and spirit of the invention.

What is claimed is:

1. A wavefront sensor, comprising:
   radiation sensor means; and
   an array of lenslets optically coupled to said radiation sensor means, said array of lenslets having a radiation receiving surface for receiving an incident wavefront and for focussing the wavefront at a plurality of focal positions upon said radiation sensor means, wherein each of said lenslets is comprised of a diffractive optical element having an optical center that is located at a predetermined point for inducing an equal and opposite tilt to a portion of the wavefront incident on the lenslet for substantially cancelling an aberration within that portion of the wavefront.

2. A wavefront sensor as set forth in claim 1 and further including means, having an input coupled to an output of said radiation sensor means, for determining a location of each of the plurality of focal positions and for comparing the determined locations to locations of predetermined focal positions corresponding to a null corrected aberrated wavefront.

3. A wavefront sensor as set forth in claim 1 wherein, for Seidel spherical aberration, the predetermined point is determined to be equal to and opposite a focal spot shift of said lenslet in accordance with the expression:

spot shift = $4a\rho_i^3 F$, wherein F is the focal length of said lenslet, (a) is a magnitude of the aberration, and where $(\rho_i)$ is a radial distance of an $i^{th}$ lenslet from a center of the wavefront.

4. A wavefront sensor as set forth in claim 1 wherein each of said lenslets comprises a binary diffractive optical element.

5. A wavefront sensor as set forth in claim 4 wherein said binary diffractive optical element is comprised of a plurality of steps of approximately equal height.

6. A wavefront sensor as set forth in claim 1 wherein said radiation sensor means is comprised of a two dimensional array of discrete radiation sensor elements, wherein for each of said lenslets there are an associated plurality of discrete radiation sensor elements, and wherein each of said associated plurality of discrete radiation sensor elements includes at least a two by two sub-array of discrete radiation sensor elements.

7. A method of fabricating a lenslet array for use with a wavefront having a known aberration, comprising the steps of:

for each lenslet of the lenslet array, determining a location of an optical center of the lenslet relative to a geometric center of an array cell within which the lenslet is contained, the step of determining including the steps of, determining a focal spot shift of the aberrated wavefront at a position of the lenslet cell; and shifting the optical center of the lenslet by an equal and opposite amount to the determined focal spot shift; and wherein the method further includes a step of fabricating the lenslet into or upon a surface of a substrate such that the optical center of the lenslet is positioned away from the geometric center of the cell by an amount equal to and opposite the determined focal spot shift.

8. A method as set forth in claim 7 wherein, for Seidel spherical aberration, the step of determining includes a step of determining a focal spot shift of the lenslet in accordance with the expression:

$$\text{spot shift} = 4a\rho_i^3 F,$$

wherein F is the focal length of the lenslet, (a) is a magnitude of the aberration, and where $(\rho_i)$ is a radial distance of an $i^{th}$ lenslet from a center of the wavefront.

9. A method as set forth in claim 7 wherein the step of determining a focal spot shift includes an initial step of determining an average slope of the wavefront over each lenslet of the array of lenslets.

10. A method as set forth in claim 9 wherein the step of determining an average slope treats each lenslet as a point.

11. A method as set forth in claim 9 wherein the step of determining an average slope integrates a portion of the wavefront that is incident upon each lenslet.

12. A null corrector for use with an aberrated wavefront, comprising:

a lenslet array having a plurality of lenslets, each lenslet of the lenslet array including a diffractive optical element having a location of an optical center thereof disposed a predetermined distance away from a geometric center of an array cell within which the lenslet is contained, the predetermined distance being equal and opposite to a focal spot shift of the lenslet, the focal spot shift being found, in the case of Seidel spherical aberration, in accordance with the expression, $$\text{spot shift} = 4a\rho_i^3 F,$$

wherein F is the focal length of said lenslet, (a) is a magnitude of the aberration, and where $(\rho_i)$ is a radial distance of an $i^{th}$ lenslet from a center of the wavefront.

13. A null corrector as set forth in claim 12 wherein said diffractive optical element is a binary optics lens element that is optically equivalent to a Fresnel zone plate.

14. A null corrector as set forth in claim 13 wherein said binary lens element includes at least two steps of approximately equal height, the steps being formed upon or within a surface of a transparent substrate.

15. A Hartmann-Shack Wavefront Sensor for measuring an aberration of a wavefront reflecting from a surface, comprising:

means for relaying a pupil of an optical system to a location away from a focal plane of the optical system; and means, positioned at the location, for sensing a wavefront, said sensing means including, radiation sensor means; and an array of lenslets optically coupled to said radiation sensor means, said array of lenslets having a radiation receiving surface for receiving an incident wavefront and for focussing the wavefront at a plurality of focal positions upon said radiation sensor means, wherein each of said lenslets is comprised of a diffractive optical element having an optical center that is located at a predetermined point for inducing an equal and opposite tilt to a portion of the wavefront incident on the lenslet for substantially cancelling an aberration within that portion of the wavefront.

* * * * *